3,543,127
BATTERY CHARGING CIRCUIT
Warren C. Fry, Connellsville, and Eugene L. Kilbourn, Marshall, Pa., assignors to Westinghouse Electric Corporation, Pittsburgh, Pa., a corporation of Pennsylvania
Filed Apr. 16, 1968, Ser. No. 727,132
Int. Cl. H02j 7/04
U.S. Cl. 320—39          11 Claims

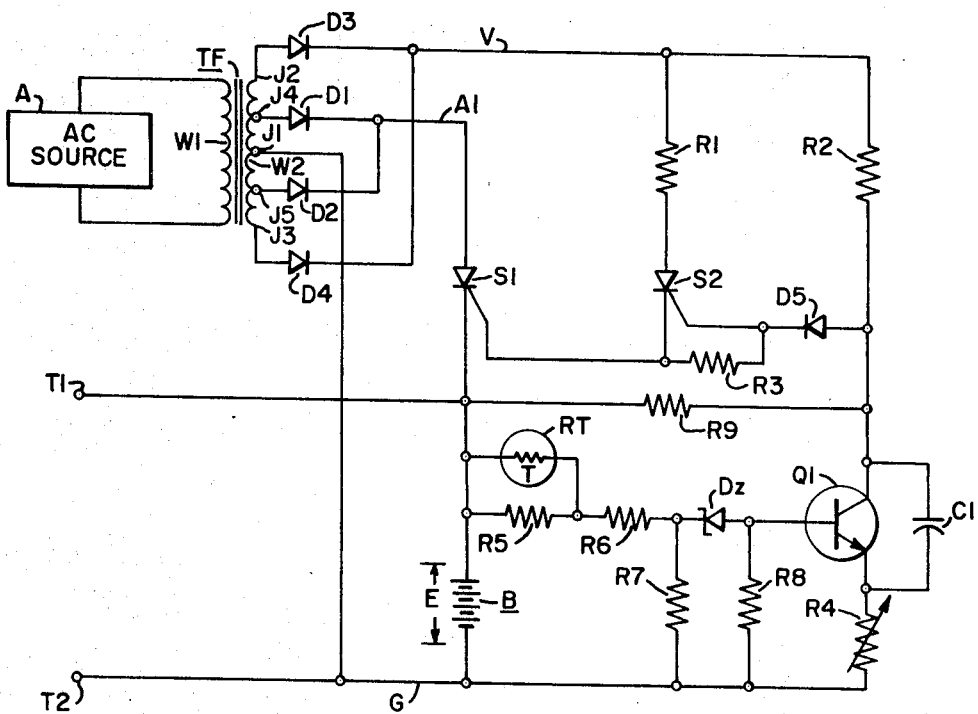

ABSTRACT OF THE DISCLOSURE

A battery charging circuit is disclosed operative from an AC source whereon the AC output is converted, by for example, transformation and rectification, to a first unidirectional output voltage and a second unidirectional output voltage at a boosted level from the first voltage. A power controlled switching device, such as a silicon controlled rectifier, is provided and receives the first unidirectional output voltage. Gating means are provided for the power controlled switching device and may comprise a gating controlled switching device, such as a silicon controlled rectifier, which is supplied from the second unidirectional output voltage. The power device is gated on in response to the gating on of the gating device. The battery to be charged is connected to a principal electrode circuit of the power device to be charged by current flow therethrough. A reference circuit, which may include a Zener diode and a transistor, is utilized for controlling for charging of the battery in response to the battery voltage and for terminating the charging thereof when the battery voltage reaches a predetermined value. Temperature compensating means may also be included in the reference circuit for compensating for any variations in the operating temperature of the charger.

BACKGROUND OF THE INVENTION

Field of the invention

The present invetnion relates to battery charging circuitry and, more particularly, to low-cost, high-efficiency battery charging circuitry.

Discussion of the prior art

A commonly used battery charging circuit employs a power silicon controlled rectifier for supplying charging current to a battery connected in the anode-cathode circuit thereof. The AC output of an AC line source is transformed and full-wave rectified to supply the anode of the controlled rectifier, with the gate electrode thereof being supplied from the full-wave rectified output via a gating resistor and a gating diode. A Zener diode is connected between the junction of the resistor and diode in the gate circuit of the controlled rectifier and the negative electrode of the battery. The power controlled rectifier is gated on when the Zener voltage exceeds the battery voltage causing the charging current to flow through the anode-cathode circuit of the controlled rectifier to the battery. The Zener diode is so selected that when the battery reaches the prescribed operating voltage insufficient gating voltage is provided across the gate-cathode circuit of the power controlled rectifier to turn it on, and the charging process ideally is terminated. The above-described circuit has a number of deficiencies. (1) Since the Zener diode is used as the reference device for the battery voltage, it is necessary that the Zener have an extremely low dynamic resistance in order to maintain voltage constant independent of current flow. It is quite difficult to obtain Zener diodes consistently of such quality. (2) Because of dissipation in the firing resistor and the Zener diode, the power controlled rectifier selected should have a low gating current. This limitation increases the cost of the power controlled rectifier, and it is difficult to obtain such low gate current devices consistently. (3) The gating voltage and current of the power controlled rectifier changes with temperature and thus causes poor temperature regulation of the output voltage appearing across the battery. (4) Since the anode and gate of the power controlled rectifier are supplied from the same full-wave rectified voltage, the transformer must be designed to supply a higher RMS value of current because of the firing delay due to the anode firing which increases the cost of the transformer because of the poor current form factor caused thereby.

The deficiencies discussed in (1) and (2) above are substantially solved in the battery charging circuit shown in the G.E. SCR Handbook, third edition, page 108, Figure 7.6. However, two other problems are introduced by the use of this circuit. The circuit described in the SCR Handbook utilizes the same firing circuit for the power controlled rectifier; however, rather than using the Zener reference device, a second controlled rectifier is connected between the junction of the gating resistor and diode and the negative electrode of the battery. A voltage divider is connected across the battery with a Zener diode connected between the tap point on the voltage divider and the gate of the second controlled rectifier. A storage capacitor is connected between the gate of the second controlled rectifier and the negative electrode of the battery. The two additional problems introduced by the use of this circuit are: (1) The circuit either tends to half cycle which causes transformer noise and excessive heating or supplies less than rated battery voltage to the load. This problem is caused due to the Zener diode breaking over during the charging portion of the operating cycle and charging the capacitor to supply gating voltage to the second controlled rectifier. If the capacitor is selected to have a low value of capacitance, half cycling tends to occur preventing controlled rectifier from turning on each half cycle as the battery approaches full charge. The power controlled rectifier is turned on only every other half cycle and transformer noise and excessive heating results if the capacitance is made larger, the capacitor will maintain its charge longer and keep the second controlled rectifier turned on and the power controlled rectifier off over a number of half cycles. Since the battery has internal impedance, the battery votlage will rise and fall with the beginning and termination of charging. This may be highly annoying to a user if the changing battery voltage causes the lights to flicker. (2) The second controlled rectifier may remain conductive and thus lock the power controlled rectifier off due to the low holding current value which is typical of controlled rectifiers of this power rating. If the second controlled rectifier should lock on, no condition of battery discharge can then restart charging until the substantially full discharge of the battery.

The battery charging circuit of the present invention solves all the problems as discussed above. In particular, the problems associated with special requirements for the power controlled rectifier are eliminated by providing a separate gating circuit for the power device. Moreover, rather than using an anode fired system, a boost voltage is provided to permit the turning on of the power controlled rectifier at the earliest possible conduction angle thereby providing a substantial cost reduction in the transformer of the circuit. Also very accurate voltage control is provided by taking the reference directly from the battery during the period that it is not being charged. The reference is also independent of changes in the gating voltage or current of the power controlled rectifier due to temperature changes. The half cycling and battery voltage ripple due to its internal impedance is also eleminated by the use of a transistor rather than the second controlled rectifier. It also prevents lock on of the second controlled rectifier. Temperature compensation is also provided in the present circuit to eliminate overcharging of the battery at elevated temperature levels which could be destructive of the battery.

SUMMARY OF THE INVENTION

Broadly the present invention provides a battery charging circuit operative and with alternating current source whose output is converted to a unidirectional voltage to supply a power controlled switching device. A gating circuit is provided for the power switching device and which may be supplied from a second unidirectional output at a boosted voltage level from the output supplying the power controlled switching device. Reference means responsive to the battery voltage is provided for controlling the charging of the battery and for terminating the charging thereof when the battery reaches a predetermined voltage.

BRIEF DESCRIPTION OF THE DRAWING

The single figure is a schematic diagram of the battery charging circuit of the present invention.

DESCRIPTION OF THE PREFERRED EMBODIMENT

Referring to the figure the input power to the battery charging circuit is an AC source A, whose output may be typical line voltage of 120 volts at 60 Hz. The AC output of the source A is applied to the primary winding W1 of an input transformer TF. The transformer TF includes a secondary winding W2 having a center tap joint J1, which is connected to a common line G, top and bottom end point J2 and J3, respectively, and tap points J4 and J5. The alternating voltage developed between the points J4 and J5 is full-wave rectified via a diode D1 and a diode D2 which have their anodes, respectively, connected to the points J4 and J5 and their cathode commonly connected at a line A1 at the anode electrode of a power controlled switching device S1, which may comprise a silicon controlled rectifier (SCR). The voltage developed at the anode of the controlled rectifier S1 is the full-wave rectified output of the AC input to the transformer TF at a desired voltage level for charging a battery B which has its positive electrode connected to the cathode of power SCR S1 and its negative electrode connected to the common line G. A pair of load terminals T1 and T2 are connected, respectively, to the positive and negative electrodes of the battery B and to which an appropriate load may be connected during the charging of the battery, or the load may be disconnected from battery while it is being charged.

For full-wave rectifying the total output voltage across the secondary winding W2 between the end points J2 and J3, diodes D3 and D4 are provided the anode of diode D3 is connected to the end point J2 and the anode of the diode D4 is connected to the end point J3, the cathodes of the diodes D3 and D4 being commonly connected to provide a full-wave rectified output at a boost line V which is at a boosted voltage level with respect to the voltage appearing at the line A1 at the anode of the power SCR S1. The boosted level may be two or three volts higher than at the line A1, and this may be accomplished by adding a few additional turns of windings between the junction point J4 and the end point J2 and between the junction point J5 and the end junction point J3 of the secondary winding W2. The advantage of providing these several volts of boost voltage as compared to the voltage applied to the anode of the power SCR S1 will become apparent from the discussion below. As typical operating examples, 18 volts peak may be developed between points J1 and J4 or J1 and J5, while 20 volts peak would be developed between points J1 and J2 or J1 and J3.

The unidirectional full-wave rectified boost voltage at the line V is applied via a current limiting resistor R1 to the anode of a gate controlled switching device S2, which may comprise a silicon controlled rectifier, however, of a much lower power rating compared to the power SCR S1. The cathode of the SCR S2 is connected to the gate electrode of the power SCR S1. The boost voltage at the lead V is also applied via a gating resistor R2 and a gating diode D5 to the gate electrode of the gate SCR S2. A gate-cathode resistor R3 is connected between the gate and cathode electrodes of the SCR S2.

A transistor Q1, which is shown to be of the NPN type, is provided and has its collector electrode connected to the junction between the anode of the diode D5 and the resistor R2, and its emitter coupled through a taper control resistor R3, which may be a variable resistor, to the common line G. With the battery voltage E between the positive and negative electrodes of the battery B being less than the desired level to which the battery is to be charged, the transistor Q1 is normally non-conductive. As a half cycle of the full-wave rectified boost voltage at the lead V increases, increased current is supplied through the gating resistor R2 and the diode D5 until sufficient gating current and voltage is developed at the gate-cathode circuit of the gate SCR S2. When these values are reached the gate SCR S2 will be turned on with gating current being supplied through the current limiting resistor R1 and the anode-cathode circuit of the gate SCR S2 to the gate-cathode circuit of the power SCR S1 thereby turning on the power SCR S1. Charging current is then provided from the full-wave rectified output at lead A1 to the anode-cathode circuit of the power SCR S1 and to the positive electrode of the battery B. Since the gate SCR S2 requires only a small gating current, the gating resistor R2 may be of a substantially higher value than would be required if the gate-cathode circuit of the power SCR S1 were to be directly supplied from the unidirectional source of 18–20 volts. The resistive value of the resistor R2 may for example be 1 kilo-ohm, while it might otherwise be required to use a 47 ohm resistor to supply sufficient gating current to the gate electrode of the power SCR S1 directly. Since the gating resistor R2 is in series with the collector-emitter circuit of the transistor Q1, the transistor Q1 may be selected to have a relatively low power rating since the current applied thereto when it is gated on is limited by the relatively high resistance of the resistor R2. This permits the transistor Q1 to have a lower power rating than either the Zener diode as used in the described prior art circuit or the controlled rectifier as used in the G.E. Handbook since both of these devices as used in the prior art have to carry a substantially higher current necessary for gating on the power SCR. The current limiting resistor R1 may have a relatively low value of 10 ohms, for example, in order to protect the smaller gate SCR S2 but with more than adequate gating current being supplied from the boost voltage source therethrough and through the gate SCR S2 to trigger on substantially any type of power SCR including the most insensitive of the class of power devices to be used. This permits the selection of a wide variety of power SCR's which will adequately perform in the circuit configuration as shown herein. This provides a substantial economy since it is not necessary to utilize only those power SCR's having a low gating current value as is required in the prior art circuits. The use of the gate SCR S2 between the boost voltage and the gate of the power SCR S1 acts as essentially a gate amplifier and therefore provides a more than sufficient supply of gating current for a wide variety of power SCR's.

As the half cycle of the boosted full-wave rectified voltage approaches zero, the gate SCR device S2 will turn off as will the power SCR S1 being supplied from the full-wave rectified voltage at the A1. During subsequent half cycles the battery E will continue to be charged in the fashion described assuming that the transistor Q1 is not conductive as will be the case when the battery E is below a predetermined voltage, which is selected to be its rated full charge voltage.

A reference circuit including the transistor Q1 is provided for regulating the charging of the battery B and to terminate the charging thereof when the battery voltage reaches its rated operating level. The reference circuit includes a sensing voltage divider circuit for developing thereacross a voltage proportional to a battery voltage E. The voltage divider includes the series connection of the parallel combination of a resistor R4 and a thermistor device RT having a negative temperature coefficient, a resistor R6 and a resistor R7. The free end of the parallel combination of R4 and RT is connected to the positive electrode of the battery B and the free end of the resistor R7 is connected to the negative electrode of the battery B at the common line G. The voltage developed across the resistor R7 is proportional to the battery voltage E. A Zener diode Dz is provided in the reference circuit and has its cathode connected to the junction of the resistors R6 and R7 and its anode connected to the base electrode of the transistor Q1. A resistor R8 is connected between the base electrode of the transistor Q1 and the common line G. Whenever the battery voltage reaches a predetermined value, for example 14 volts at 70° F., the Zener diode Dz will breakover to supply base drive to the transistor Q1 thereby turning on the transistor Q1 which provides a shunt path for current flow in the resistor R2, diode D5 and the gate-cathode circuit of the SCR S2. The shunting away of this current through the transistor Q1 causes insufficient gating current to be supplied to the gate SCR S2 which prevents the gate SCR S2 from being turned on as long as the transistor Q1 is conductive. With the gate SCR S2 not being gated on, no gating current will be supplied to the power SCR S1 and therefore will not translate charging current therethrough to the battery B during that half cycle of the full-wave rectified anode voltage at lead A1 or during subsequent half cycles as long as the transistor Q1 is maintained conductive. The reference circuit described senses the battery voltage during each half cycle of the full-wave rectified input voltages to the charging circuit. If after the end of a charging half cycle, the battery voltage B should drop so that the voltage across the Zener diode Dz is less than the required base drive to the transistor Q1, it will turn off at that time causing sufficient gate drive current to be supplied via the resistor R2 and diode D5 to the gate-cathode circuit of the gate SCR S2, thereby turning on the gate SCR S2 and, in response thereto, the power SCR S1 is turned on which supplies additional charging current to the battery E.

It can thus be seen as the battery voltage E builds up with repeated charging half-cycles the transistor Q1 is maintained conductive for longer and longer periods of time so that the conduction angle at which the transistor Q1 is turned off and gating current is supplied to the gate SCR S2 increases further and further into the half cycle until the transistor Q1 is maintained conductive during the entire half cycle when the battery voltage E has reached its rated value.

The reference circuit senses the battery voltage E during the noncharging portion of the cycle which is the voltage of interest and controls the duty cycle of the transistor Q1 in response thereto. This is in distinction to prior art systems such as shown in the G.E. Handbook wherein the peak value of the battery voltage is detected via a capacitor during the charging period. This peak detected voltage is then utilized for gating on a controlled rectifier which then remains on until the capacitor voltage has sufficiently discharged. Thus the charging action will be terminated. The charging action of the G.E. Handbook circuit will not begin again until the capacitor voltage has sufficiently discharged to not supply a sufficient gate drive to the controlled rectifier. The battery voltage appiled to the load will rise and fall thereby causing flickering of lights that may be in the load circuit causing annoyance to the user. If, on the other hand, the capacitor in the G.E. Handbook circuit is made very small to avoid this problem, half cycling may occur with the power SCR being turned on every other half cycle causing thereby noisy operation of the transformer and excessive heating thereof. These problems are solved in the circuit described herein with the battery voltage E being sensed during the noncharging portion of the cycle and the transistor Q1 turning off as soon as insufficient base drive is supplied thereto. Moreover, as the battery voltage E increases, the quantity of charging current supplied to the battery is accordingly decreased with the tapering off rate being controllable via the resistor R3. A resistor R9 is connected between the cathode of the power SCR S1 and the collector of the transistor Q1 to add some additional DC current to the transistor Q1 when the power SCR S1 is conductive and to assist in the tapering off conduction of the transistor Q1. The taper control resistor R3 is utilized to control the slope at which the quantity of charging currents supplied to the battery B is reduced as the battery reaches rated charged voltage. This is desirable since providing full charge current to the battery as it approaches full charge may be damaging thereto and may cause the boiling thereof which may be destructive. By varying the resistive value of the taper control resistor R3, the duty cycle of the transistor Q1 may be controlled so that the quantity of charging current supplied to the battery B is gradually decreased once the battery reaches a sufficient voltage to turn on the transistor Q1 during a portion of the corresponding half cycle. A damping capacitor C1 is connected between the collector and emitter electrodes of the transistor Q1 in order to prevent any undesired conduction of the transistor Q1 due to a spurious interference, such as from fluorescent lights in the load circuit, interfering with the proper operation of the transistor Q1.

An additional advantage is provided in the present circuit through the use of the negative temperature coefficient thermistor RT in the voltage divider network. Typical values for the voltage divider components may be R5—1 kilo-ohm, R6—560 ohm, R7—8.2 to 20 kilo-ohms and RT—1 kilo-ohm at 70° F. Having a negative temperature coefficient the thermistor RT will decrease in resistance value as the temperature of circuit operation increases. Thus, as the temperature increases and the resistance of the thermistor RT decreases, the voltage developed across resistor R7 will increase for a given battery voltage. This means that as a higher temperature the Zener diode Dz will breakover a lower battery voltage and will thereby increase the duty cycle of the transistor Q1 which terminantes the charging of the battery B. With increasing temperature the battery B will be charged to a lower voltage. For example, if the battery is to be charged to 14 volts at 70° F., this may be decreased to 13.4 volts at 125° F., while it may be conversely increased to 15 volts at 0° F. This temperature compensating feature is highly advantageous especially when the battery charger is to be operated under varying temperature conditions. It is especially desirable in warm climates wherein the battery may boil by the excessive application of charging current thereto under high temperature conditions.

Although the present invention has been described with a certain degree of particularity, it should be understood that the present disclosure has been made only by way of example and that numerous changes in the details of circuitry and the combination and arrangement of parts, elements and components can be resorted to without departing from the spirit and the scope of the present invention.

We claim:

1. A charging circuit operative with an AC source for charging a battery comprising:
   a power controlled switching device, said battery being operatively connected thereto;

converting means responsive to said AC source for providing a first unidirectional output voltage and a second unidirectional output voltage at a boosted level from said first output voltage;

gating means responsive to said second voltage level for causing current developed by said first output voltage to be translated through said power controlled switching device to charge said battery; and reference means for controlling the charging of said battery in response to the battery voltage and terminating the charging thereof when the battery voltage reaches a predetermined value.

2. The charging circuit of claim 1 wherein:

said power control switching device including principal and control electrodes, said gating means comprising a gating controlled switching device including principal and control electrodes and being operative to translate gating signals through the principal electrodes thereof to the control electrode circuit of said power device in response to said second voltage to cause current developed by said first voltage to be translated through the principal electrode circuit of said power device to charge said battery.

3. The charging circuit of claim 2 including:

first means for applying said first voltage to the principal electrode circuit of said power device, and second means for applying said second voltage to the principal electrode circuit and control electrode circuit of said gating device.

4. The charging circuit of claim 3 wherein:

said converting means comprising a transformer responsive to said AC source for supplying a first AC voltage and a second AC voltage at a boosted level from said first AC voltage, first rectifying means responsive to said first AC voltage for providing said first unidirectional voltage as the full-wave rectified waveform of said first AC voltage to said first means, and second rectifying means responsive to said second AC voltage for providing said second unidirectional voltage as the full-wave rectified waveform of said second AC voltage to said second means.

5. The charging circuit of claim 4 wherein:

said reference means comprising sensing means for providing a control voltage in response to the battery voltage during each half cycle of said AC source, and switching means operative to control said gating device so that said battery is charged in response to said control voltage and the charging terminating when said battery voltage reaches said predetermined value.

6. The charging circuit of claim 5 wherein:

said switching means including:

a voltage reference device and a transistor including principal and control electrodes, said voltage reference device operatively connected between said sensing means and said control electrode of said transistor to break over and render conductive the output electrode circuit of said transistor in response to said control voltage, the output electrode circuit of said transistor operatively connected to the control electrode circuit of said gating controlled switching device so that the conductivity of said transistor controls the translation of gating signals through said gating device.

7. The charging circuit of claim 4 wherein:

said power control switching device comprising a power controlled rectifier including anode and cathode electrodes corresponding to said principal electrodes and a gate electrode corresponding to said control electrodes, said anode electrode and said cathode electrode of said power controlled rectifier operatively connected to said first means and said battery respectively, said gating controlled switching device comprising a gating controlled rectifier including anode and cathode electrodes corresponding to said principal electrodes and a gate electrode corresponding to said control electrode, said anode electrode and said gate electrode of said gating controlled rectifier operatively connected to said second means and said cathode electrode of said gate controlled rectifier operatively connected to said gate electrode of said power controlled rectifier.

8. The charging circuit of claim 7 wherein:

said reference means comprising:

sensing means for sensing the battery voltage during each half cycle of said AC source, a voltage reference device and a transistor including principal and control electrodes, said voltage reference device operatively connected between said sensing means and said control electrode of said transistor to break over and render conductive said transistor in response to said battery voltage, the output electrode circuit of said transistor being operatively connected to the control electrode of said gating controlled rectifier so that the conduction of said transistor controls the translation of gating signals through said gating controlled rectifier.

9. The charging circuit of claim 5 wherein:

said sensing means comprising a voltage divider operatively connected across said battery to provide said control voltage at a point thereon, said voltage divider including a temperature responsive device so that said control voltage is dependent on the temperature of operation of said charging circuit.

10. The charging circuit of claim 9 wherein:

said temperature responsive device comprising a thermistor having a negative temperature coefficient so that said control voltage increases with temperature.

11. The charging circuit of claim 1 wherein:

said reference means comprising sensing means for sensing the battery voltage during each half cycle of said AC source.

References Cited

UNITED STATES PATENTS

| | | | |
|---|---|---|---|
| 3,121,837 | 2/1964 | Holm et al. | 320—35 X |
| 3,160,805 | 12/1964 | Lawson | 320—39 |
| 3,179,871 | 4/1965 | Bagho | 320—30 |
| 3,193,733 | 7/1965 | Orsino | 317—148.5 |
| 3,305,755 | 2/1967 | Walsh | 320—40 |
| 3,372,324 | 3/1968 | Scarlett | 320—39 |

J D MILLER, Primary Examiner

J. M. GUNTHER, Assistant Examiner

U.S. Cl. X.R.

320—35